Patented July 8, 1952

2,602,752

UNITED STATES PATENT OFFICE 2,602,752

SHIP HULL ANTIFOULING PAINT

William J. Francis, Portsmouth, Va.

No Drawing. Application February 3, 1950, Serial No. 142,343

3 Claims. (Cl. 106—17)

(Granted under the act of March 3, 1883, as amended April 30, 1928; 370 O. G. 757)

This invention relates to ship hull anti-fouling paints and more particularly to a paint of this type which maintains its anti-fouling property over unusually long time periods.

For many years use has been made of anti-fouling paints on ship hulls and other surfaces exposed to sea wash. However, the effectiveness of these paints has usually been short so that ships were limited to cruise periods of a year or less before marine organisms, which include barnacles, annelids, mollusks, hydroids, tunicates and algae, had reduced cruising speeds to pronouncedly low values. Moreover, these former paints have been found to possess in many cases certain deficiencies such as long drying times on initial application, inclusion of imported or rare elements, sagging tendency on fresh application or under high temperatures, and poor shock and crack resistance time.

The presently described paint has been found to overcome the above mentioned disadvantages and to show a definite improvement in effective life. Briefly stated the invention is a composition which includes, with toxic cuprous oxide, rosin and wax, an appreciable percentage of metallic soaps of fatty acids or of naphthenic acid as a plasticizer for the rosin, a control agent for the leaching element and an efficient sag control component.

Among the objects of the invention are to provide a composition having increased life in use, having no sagging tendencies under high temperature conditions, having resistance to shock and low temperature shrinking, and possessing strong base adhesion and anti-fouling properties. Further objects are to secure a paint which dries rapidly on application, has low viscosity to facilitate spray application, has good stability when held under heated conditions prior to application, is self-leveling to a thin coat, is relatively impermeable and non-absorptive in sea-water, and is strongly erosion resistant.

Other objects of the invention as well as attendant advantages and uses thereof, will become apparent on consideration of the following detailed description of the specific composition together with the process of making the same.

The composition and percentages of ingredients therein follow:

|  | Range | Preferred |
|---|---|---|
|  | Per Cent | Per Cent |
| Gum rosin | 36.67 to 41.67 | 41.67 |
| Paraffin wax | 4.44 to 8.00 | 4.44 |
| Ceresine wax | 2.38 to 4.55 | 2.38 |
| Copper linoleate | 13.64 to 24.0 | 13.64 |
| Cuprous oxide | 32.46 to 37.87 | 32.46 |
| Inert pigment (asbestine) | 0 to 5.41 | 5.41 |

All the mentioned ingredients of the composition are necessary in this type of formula. The primary function of the waxes is to reduce the viscosity of the composition to a suitable spraying consistency when heated in the range from 260 to 300° F. The paraffin also functions as a plasticizer for the rosin. The ceresin wax (melting point 173–175° F.) increases the sag resistance properties of the applied composition, i. e. it helps prevent the sagging or flowing of the applied coating when high temperature conditions prevail or when subjected to direct sunlight. The purpose of the metallic soap is to improve the physical properties of the film and promote adhesion and to improve the copper leaching characteristics of the film under sea water immersion conditions. The rosin functions as the main resinous binder ingredient of the matrix. The cuprous oxide functions as the toxic ingredient for the anti-fouling paint. The magnesium silicate such as asbestine promotes better suspension of the total pigment in the paint, and also improves the anti-fouling action of the composition. If the ceresine wax were eliminated from the composition, the paint film would have deficient sag resistance properties. If paraffin were eliminated, the composition would have too high a viscosity for spray application.

In preparing the composition the waxes and rosin are placed in a steam-jacketed steel kettle and heated to approximately 250° F. until the ingredients are melted. The metallic soap is then added. This soap is selected from the group including copper naphthenate, copper linoleate, copper tallate, copper oleate and zinc naphthenate, with preference given to copper linoleate. The mixture of heated waxes, rosin and soap is stirred slowly and continuously by mechanical means while the temperature is slowly increased to a value of around 300° F. When the batch is entirely liquefied, cuprous oxide (or metallic copper) and asbestine are slowly sifted into the mix while maintaining the agitation and the temperature at about 300° F. for a time period of at least 15 minutes after all the ingredients are in the kettle so as to insure adequate dispersion. The finished product is then drained off into drums and allowed to cool and solidify; after which the solid plastic may be broken into small chunks for transportation.

In use the chunks of plastic are melted in an open kettle provided with a steam jacket for heating to a temperature range of 250°–350° F. At this temperature the composition has a low viscosity and may therefore be sprayed on the hull or other base. Preferably in hull use, the hull should have received, prior to anti-fouling paint application, a coating of anti-corrosive paint, the anti-fouling paint being applied over the anti-corrosive layer. The paint spreads readily to a smooth layer of about 30 mils thickness which is about five to ten times the thickness of the usual anti-fouling paint film.

The properties of the melted paint are such that it maintains good stability while being maintained in a molten state. On application to the hull surface it dries rapidly with a total absence of sagging. In fact, its non-sagging property is an outstanding characteristic of the paint, it being unaffected by temperatures as high as 140° F. maintained for 24 hours and as high as 162° F. for short time intervals. Moreover, only a single coat is necessary, the paint smoothing down to a uniform layer approximately 30 mils thick. Tests have indicated that the paint has a penetration at 70° F. of 84.6 (A. S. T. M. standard), a viscosity range between 260° F. and 300° F. of 74 to 35 centipoises respectively, no embrittlement of film or settling of pigments after 8 hours of heating at 300° F., capacity for spraying as low as 270° F., complete adhesion after 90 degrees base bending at 77° F., over a ½ inch rod, resistance to shock in temperature range 35° F. to 77° F., crack resistant at Dry Ice temperature, and normal adhesion of 22.5 lbs. per sq. in.

The overall usefulness of the paint as an antifouling medium is apparent from the fact that the toxic action thereof is maintained as shown by actual test for time periods of over three years with the paint still effective at the end of this period. This is a performance markedly superior to paints now commonly used for prevention of growth on ship hulls of marine organisms. Tests indicate a steady state leaching rate per month of 28.2, using the test method described by Ketchum, Ferry, Redfield and Burns (Industrial & Engineering Chemistry, vol. 37, pp. 456).

While certain materials and methods are herein specified for use in making the described paint it is understood that modifications may be made by use of equivalent materials or methods without departing from the intended scope of the invention as stated in the appended claims.

The invention described herein may be manufactured and used by or for the Government of the United States of America for governmental purposes without payment of any royalties thereon or therefor.

What is claimed is:

1. A toxic sag-resistant paint comprising rosin 36.67 to 41.67%, paraffin wax 4.44 to 8.00%, ceresine wax, 2.38 to 4.55%, copper linoleate 13.64 to 20.0%, cuprous oxide 32.46 to 37.87% and inert pigment 0 to 5.41%.

2. A toxic sag-resistant paint consisting of gum rosin 41.67%, paraffin wax 4.44%; ceresine wax 2.38%, copper linoleate 13.64%, cuprous oxide 32.46% and inert pigment 5.41%.

3. A toxic sag-resistant paint comprising rosin 36.67 to 41.67, waxes 6.82 to 12.55%, cuprous oxide 32.46 to 37.87%, an inert pigment 0 to 5.41% and 13.64 to 24.0% of a metallic soap selected from the group consisting of copper linoleate, copper naphthenate, copper tallate, and zinc naphthenate.

WILLIAM J. FRANCIS.

REFERENCES CITED

The following references are of record in the file of this patent:

UNITED STATES PATENTS

| Number | Name | Date |
|---|---|---|
| 2,280,477 | Carter | Apr. 21, 1942 |
| 2,525,155 | Thynne et al. | Oct. 10, 1950 |

FOREIGN PATENTS

| Number | Country | Date |
|---|---|---|
| 10,328 | Great Britain | of 1900 |
| 3,023 | Great Britain | of 1903 |
| 2,826 | Great Britain | of 1906 |
| 122,683 | Great Britain | Feb. 6, 1919 |